(12) United States Patent
Czinger et al.

(10) Patent No.: US 10,919,230 B2
(45) Date of Patent: Feb. 16, 2021

(54) NODE WITH CO-PRINTED INTERCONNECT AND METHODS FOR PRODUCING SAME

(71) Applicant: DIVERGENT TECHNOLOGIES, INC., Los Angeles, CA (US)

(72) Inventors: Kevin Robert Czinger, Santa Monica, CA (US); Broc William TenHouten, Rancho Palos Verdes, CA (US); John Russell Bucknell, El Segundo, CA (US); Eahab Nagi El Naga, Topanga, CA (US); Antonio Bernerd Martinez, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 673 days.

(21) Appl. No.: 15/619,379

(22) Filed: Jun. 9, 2017

(65) Prior Publication Data

US 2018/0354205 A1    Dec. 13, 2018

(51) Int. Cl.
*B29C 65/00* (2006.01)
*B33Y 80/00* (2015.01)
*F16C 11/06* (2006.01)
*B29L 31/22* (2006.01)

(52) U.S. Cl.
CPC ............ *B29C 65/002* (2013.01); *B33Y 80/00* (2014.12); *F16C 11/0685* (2013.01); *B29L 2031/22* (2013.01); *F16C 2220/24* (2013.01)

(58) Field of Classification Search
CPC .... B29C 65/002; B33Y 80/00; F16C 11/0685
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Jacob T Minskey
*Assistant Examiner* — Melody Tsui
(74) *Attorney, Agent, or Firm* — Arent Fox (57) ABSTRACT

Some embodiments of the present disclosure relate to an apparatus including an additively manufactured node. The apparatus includes an additively manufactured interconnect co-printed with the node. The interconnect is configured to connect the node to a component.

32 Claims, 8 Drawing Sheets

(56) References Cited

U.S. PATENT DOCUMENTS

| | | |
|---|---|---|
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |

(56) References Cited

U.S. PATENT DOCUMENTS

| | | |
|---|---|---|
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |

(56) References Cited

U.S. PATENT DOCUMENTS

| | | |
|---|---|---|
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2006/0229573 A1* | 10/2006 | Lamborne ............ A61M 25/007 604/263 |
| 2013/0303002 A1 | 11/2013 | Oosterhuis et al. |
| 2014/0069160 A1* | 3/2014 | Baradari ............. B21D 26/045 72/57 |
| 2014/0277669 A1 | 9/2014 | Nardi et al. |
| 2015/0187134 A1* | 7/2015 | Baecher ................ G06T 15/08 345/420 |
| 2015/0201499 A1 | 7/2015 | Shinar et al. |
| 2015/0321427 A1* | 11/2015 | Gunnarsson ....... G05B 19/4099 700/98 |
| 2016/0047497 A1 | 2/2016 | D'Entremont et al. |
| 2016/0348711 A1 | 12/2016 | Benthien et al. |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Oct. 30, 2018, regarding PCT/US2018/036317.
Notification of the First Rectification dated Dec. 24, 2018, regarding China Application No. 201820879713.3.

* cited by examiner

NODE WITH CO-PRINTED INTERCONNECT AND METHODS FOR PRODUCING SAME

BACKGROUND

Field

The present disclosure relates generally to additively manufactured techniques for connecting components to nodes, and more specifically to additively manufacturing techniques for co-printing nodes and interconnects used for connecting nodes to components.

Background

Additive Manufacturing (AM) processes involve the layer-by-layer buildup of one or more materials to make a 3-dimentional object. AM techniques are capable of fabricating complex components from a wide variety of materials. Typically, a freestanding object is fabricated from a computer aided design (CAD) model. Using the CAD model, the AM process can create a solid three-dimensional object by using a laser beam to sinter or melt a powder material, which then bonds the powder particles together. In the AM process, different materials or combinations of material, such as, engineering plastics, thermoplastic elastomers, metals, and ceramics may be used to create a uniquely shaped 3-dimensional object.

Several different printing techniques exist. One such technique is called selective laser melting. Selective laser melting entails fusing (agglomerating) particles of a powder at a temperature below the melting point of the powder material. More specifically, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator.

As AM processes continue to improve, more complex mechanical manufacturers are beginning to investigate the benefits of using additively manufactured parts in their designs. This is because, achieving efficient and effective manufacturing processes at low costs are perpetual goals of manufacturing sectors of many industries. For instance, the automotive industry, aircraft manufacturing, and other industries involved in the assembly of transport structures are constantly engaging in cost saving optimizations and looking for opportunities to improve manufacturing processes.

Joining parts is one such area that proven to be difficult to optimize. For instance, conventional manufacturing processes rely on joining separate parts together using techniques like welding, which can require costly material and may be time intensive. Improvements and potential alternatives to such techniques are therefore continually being sought by practitioners in these industries.

The recent advances in 3-dimensional printing or AM processes have presented new opportunities to build wide varieties and ranges of simple to very complex parts at relatively competitive costs. With AM, different composite materials may be used that were not previously available in traditional manufacturing processes. These materials may be lighter or more cost efficient than available predecessor materials. For a variety of reasons, however, conventional techniques such as welding may not be a viable alternative for use with some of these new materials. Therefore, it can be difficult to join additively manufactured parts to conventional commercial components.

SUMMARY

Several aspects of techniques for joining an additively manufactured node to a component will be described more fully hereinafter with reference to three-dimensional printing techniques.

One aspect of an apparatus including an additively manufactured node. The apparatus includes an additively manufactured interconnect co-printed with the node. The interconnect is configured to connect the node to a component.

Another aspect of an apparatus including additively manufactured first and second nodes. The apparatus includes an additively manufactured interconnect co-printed with the first and second nodes. The interconnect is configured to connect the first and second nodes to a tube.

Another aspect of a method of joining an additively manufactured node to a component. The method prints a node. The method co-prints, with the node, an interconnect. The node and interconnect are co-printed by an additive manufacturing process. The method receives a component. The method uses the interconnect to connect the node to the component.

Another aspect of a method of joining an additively manufactured node to a tube, the method prints first and second nodes. The method co-prints, with the first and second nodes, an interconnect. The first and second nodes and interconnect are co-printed by an additive manufacturing process. The method receives a tube. Using the interconnect, the method connects the first and second nodes to the tube.

It will be understood that other aspects of co-printing interconnects with additively manufactured nodes will become readily apparent to those skilled in the art from the following detailed description, wherein it is shown and described only several embodiments by way of illustration. As will be realized by those skilled in the art, the co-printing of interconnects with additively manufactured nodes are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of tooling shells and methods for co-printing interconnects with additively manufactured nodes will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of additively manufacturing techniques for co-printing nodes and interconnects and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting additively manufactured parts and/or commercial of the shelf (COTS) components. Additively manufactured parts are printed 3-dimensional parts that are printed by adding layer upon layer of a material based on a preprogramed design. The parts described in the foregoing may be parts used to assemble a motor vehicle such as an automobile. However, those skilled in the art will appreciate that the manufactured parts may be used to assemble other complex mechanical products such as vehicles, trucks, trains, motorcycles, boats, aircraft, and the like without departing from the scope of the invention.

By utilizing additive manufacturing techniques to co-print parts it becomes simpler to join different parts and/or components in the manufacturing process by applying an adhesive. Additive manufacturing provides the ability to create complex structures within a part. For example, a part such as a node may be printed with a port that enables the ability to secure two parts by injecting an adhesive rather than welding two parts together, as is traditionally done in manufacturing complex products.

As will be discussed herein, a node is an example of an additively manufactured part. A node may be any 3-D printed part that includes a socket for accepting a component such as a tube. The node may have a socket with an internal support structure configured to hold an interconnect in place. Such features may be co-printed with the node. Alternatively or conjunctively, the node socket may be shaped to accept a particular type of component. For instance, the internal shape of socket may be round or dovetailed to enable radial mobility or crimping of the interconnect, respectively. However, as a person having ordinary skill in the art will appreciate, a multitude of node/socket configurations may be utilized to accept a variety of different types of interconnects without departing from the scope of the disclosure.

Figure 1:
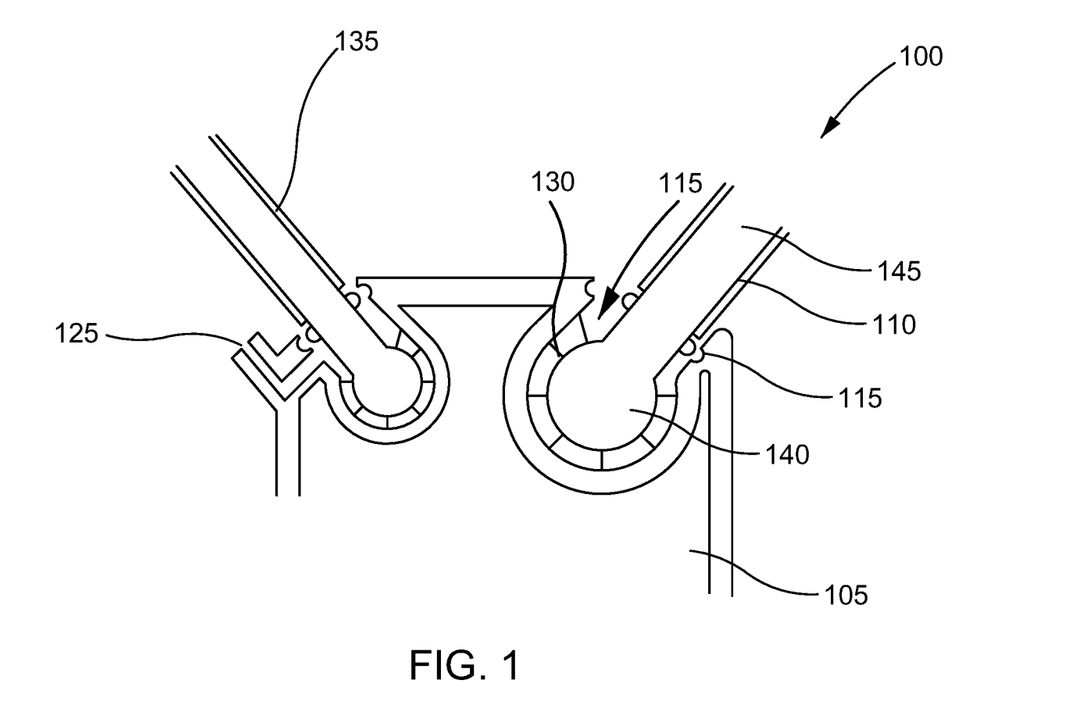
FIG. 1 illustrates an exemplary embodiment of an apparatus comprising a joined node and component.

FIG. 1 illustrates an exemplary embodiment of an apparatus comprising a joined node and component. The apparatus 100 includes a node 105, an interconnect 110, a socket 115, an injection port 125, support structure 130, and a tube 135. The interconnect 110 comprises head 140 at the proximal end and a shaft 145 at the distal end.

The node 105 and the interconnect 110 are co-printed, or additively manufactured together during the same printing process. For instance, the interconnect 110 and the node 105 may be designed in a Computer Aided Design (CAD) file that is transferred to a 3-D printing device. The 3-D printer may then process the file and initiate a print process based on the file. The node/interconnect structure may then be printed during the same print process.

During the printing process, support structure 130 may also be co-printed to hold the interconnect 110 and node 105 together in the socket 115. Support structure 130 may comprise thin spokes and/or protrusions that are configured to break apart so that the interconnect 110 is then free to move around in a rotational and/or linear manner depending on the configuration of the socket 115. The support structure 130 may also be used to confine the movement of the interconnect 110. For instance, protrusions may be used to confine the angular rotation of the interconnect 110 to be within a specific range.

As shown, the head 140 may be spherical in shape. Additionally, the head 140 is arranged with the socket 115 to form a joint. The joint may be a rotating or linear joint. The interconnect 110 is configured to connect the node 105 to a component. In some embodiments of the apparatus, the component may be a tube such as the tube 135. The shaft 145 may be configured to slide into an end portion of the tube 135. In some embodiments of the apparatus 100, the distal end of the interconnect 110 may have an end cap that is configured to slide over an end portion of the tube. An end cap may be a component that has a cylindrical shape like a tube with a slightly larger diameter that is designed to fit over a tube. Although the tube is cylindrical in this example, one having ordinary skill in the art will appreciate that a number of different shapes may be utilized for the tube and/or end cap arrangement such as a multisided polygon, without departing from the scope of the disclosure.

Additively manufacturing parts provides the ability to utilize techniques that are not available in traditional manufacturing processes that typically weld parts and/or components together. For instance, complex structures like the adhesive port 125 may be printed in the node 105. The adhesive portion 125 may include a channel that extends from an exterior surface of the node to the socket 130. The adhesive port 125 is configured to inject an adhesive material into the joint formed by the socket 115 and head 140. The adhesive material may be injected when the head 140 is positioned in such a manner that enables the shaft 145 to slide into the tube 135. In some embodiments of the apparatus 100, the shaft 145 may be inside of the tube 135 prior to adhesion injections. In some embodiments of the apparatus, the adhesive material may be a polymer such as an epoxy, resin, or any material that forms a strong bond between the interconnect 110 and the node 105. In some embodiments of the apparatus, and as will be discussed with respect to FIG. 7, a second port may also be formed in the additively manufactured node 105. The second port may be a vacuum port. The vacuum port, in some embodiments of the apparatus, may include a channel extending from an exterior surface of the node 105 to the socket 115 for enabling at least a partial vacuum environment during the adhesion process. For instance, the vacuum port may help to pull the adhesive material injected through the adhesive port 125 through and around the socket 115 by reducing the air pressure in the socket. This enables the adhesive to be applied to the socket 115 in a uniform manner free of bubbles or defects. Thus, the structural integrity of the part is maintained after adhesion.

Figure 2:
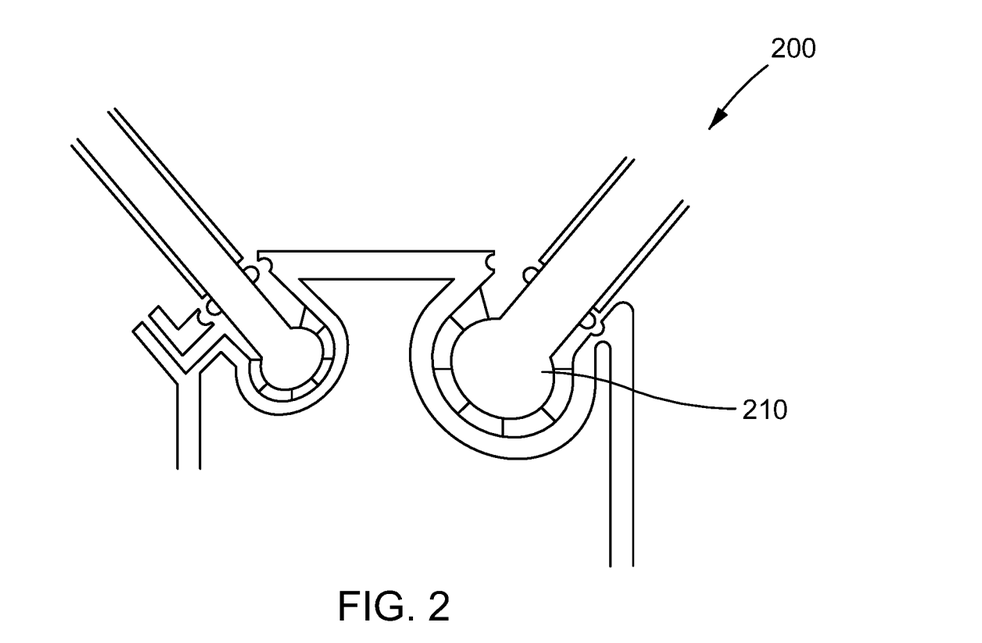
FIG. 2 illustrates an exemplary embodiment of an apparatus comprising a joined node and component.

One skilled in the art will appreciate that the node/interconnect structure described with respect to FIG. 1 is simply an example of a structure that connects a node 105 to a component such as a tube 135 and that simple variations to the parts described may be used without departing from the scope of the invention. For instance, FIG. 2 illustrates an exemplary embodiment of an apparatus 200 comprising a joined node and component. The apparatus 200 has many similar features to those discussed with respect to FIG. 1. However, the head 210 of the interconnect has an ellipsoidal shape rather than the circular shape described with respect to FIG. 1. The ellipsoidal shape may provide a different range of motion for the joint. Thus, the node/interconnect structure can be designed or configured in a variety of different ways to adapt to the manufacturing constraints or needs that may exist when manufacturing a complex mechanical structure. Additionally, one of ordinary skill in the art will appreciate that the illustrated socket and/or head of the node and interconnect, respectively, need not be confined to the spherical or ellipsoidal shapes discussed above. In fact, any suitable shape that provides the requisite mobility for manufacturing the complex mechanical structure may be utilized without departing from the scope of the invention.

Figure 3:
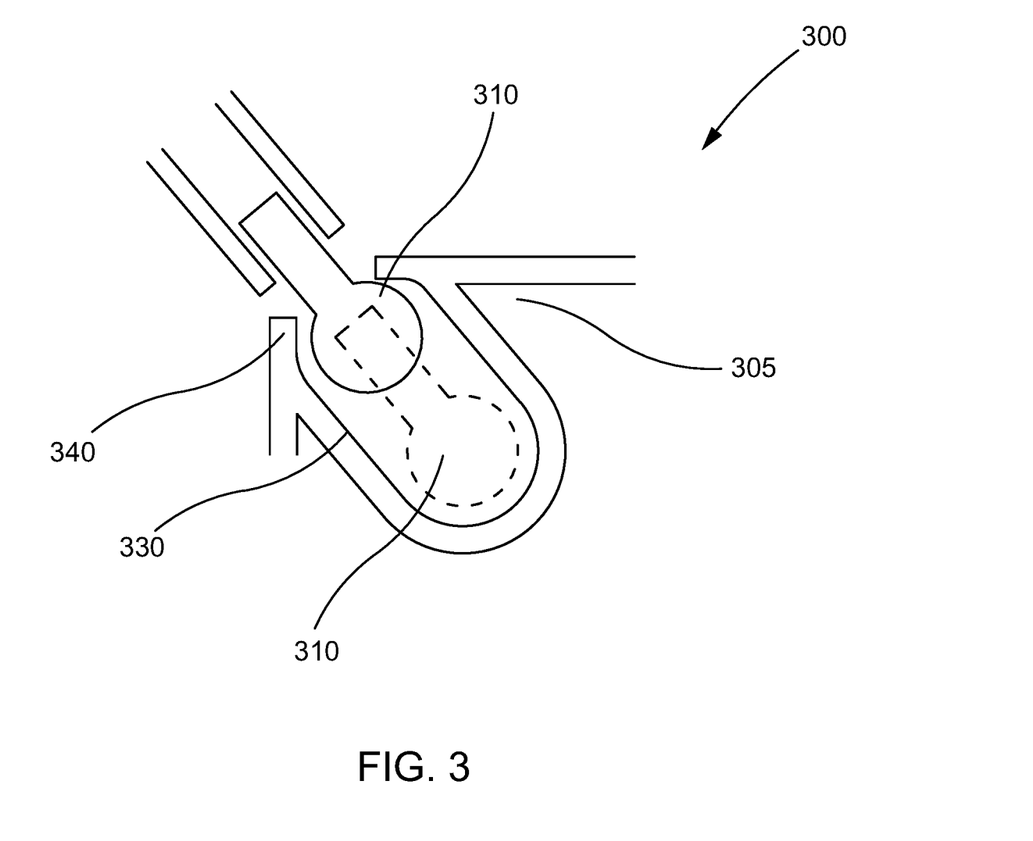
FIG. 3 illustrates an exemplary embodiment of an apparatus having a node and component.

FIG. 3 illustrates an exemplary embodiment of an apparatus 300 having a node and component. As shown, the apparatus 300 includes a node 305, an interconnect head 310, and a socket 330, each similar to the node 105, interconnect head 140, and socket 130, respectively. The interconnect head 310 and socket 330, together, forms a joint. The joint is similar to that of FIG. 1. However, it varies in that the interconnect head 310 is confined such that significant linear movement is available, but rotational movement is minimized.

Figure 4:
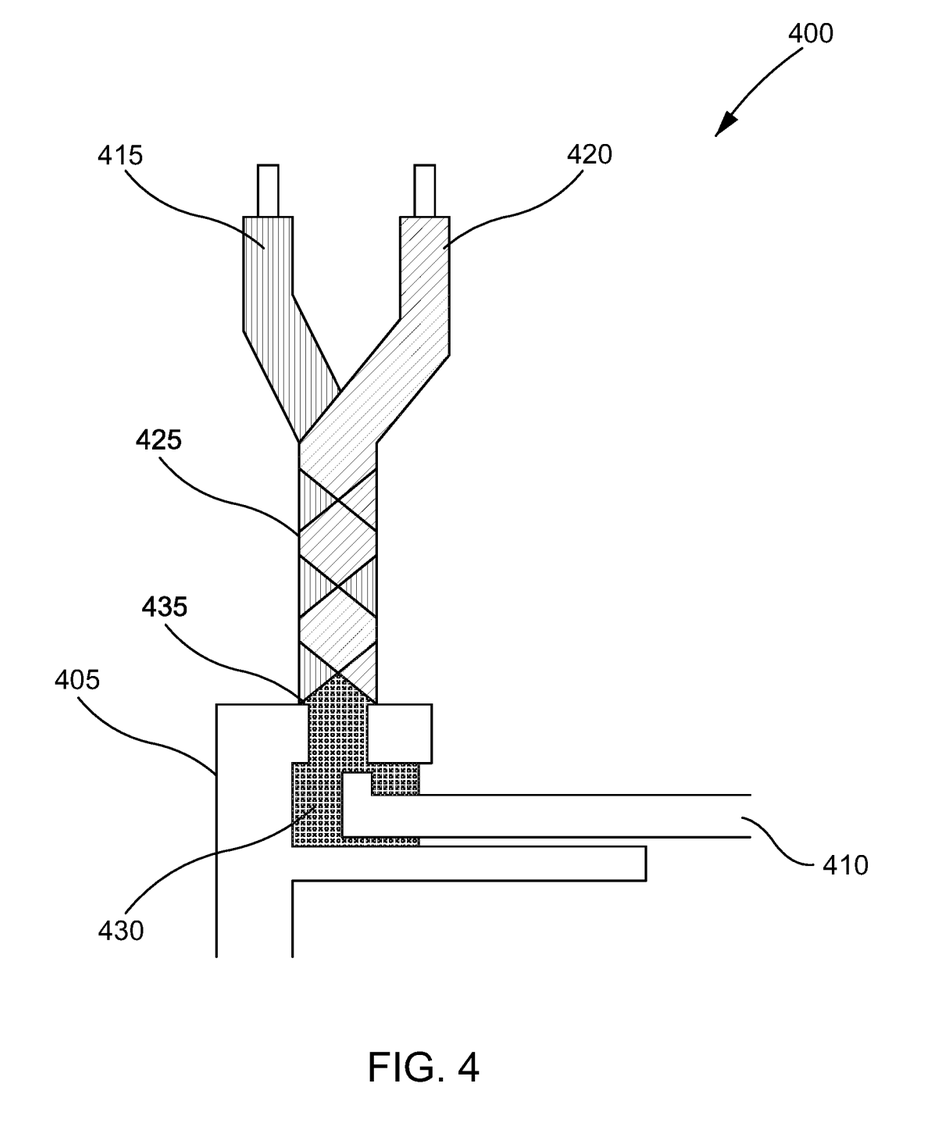
FIG. 4 illustrates a component with a detachable adhesive mixer.

In some embodiments of the apparatus, a mixture that forms an adhesive material may be applied. For instance, FIG. 4 illustrates an apparatus 400 with a detachable adhesive mixer 425. As shown, the apparatus 400 includes the detachable adhesive mixer 425, a node 405, an interconnect 410, a first material 415, a second material 420, a socket 430, and injection port 435. The detachable adhesive mixer may be connected to the adhesive port 435. A mixture of the first and second materials 415 and 420 may be injected into the injection port 435. The mixture may then fill the socket 430 such that the interconnect 410 is adhered to the node 405 by way of the socket 430. The detachable adhesive mixer allows for the use of two-part adhesives in the adhesion process.

As discussed above, additively manufacturing parts provides the capability of printing nodes and/or interconnects in a variety of different shapes. This provides greater customizability to meet a variety of needs when manufacturing a complex mechanical product. Such customizability reduces cost and manufacturing time.

Figure 5:
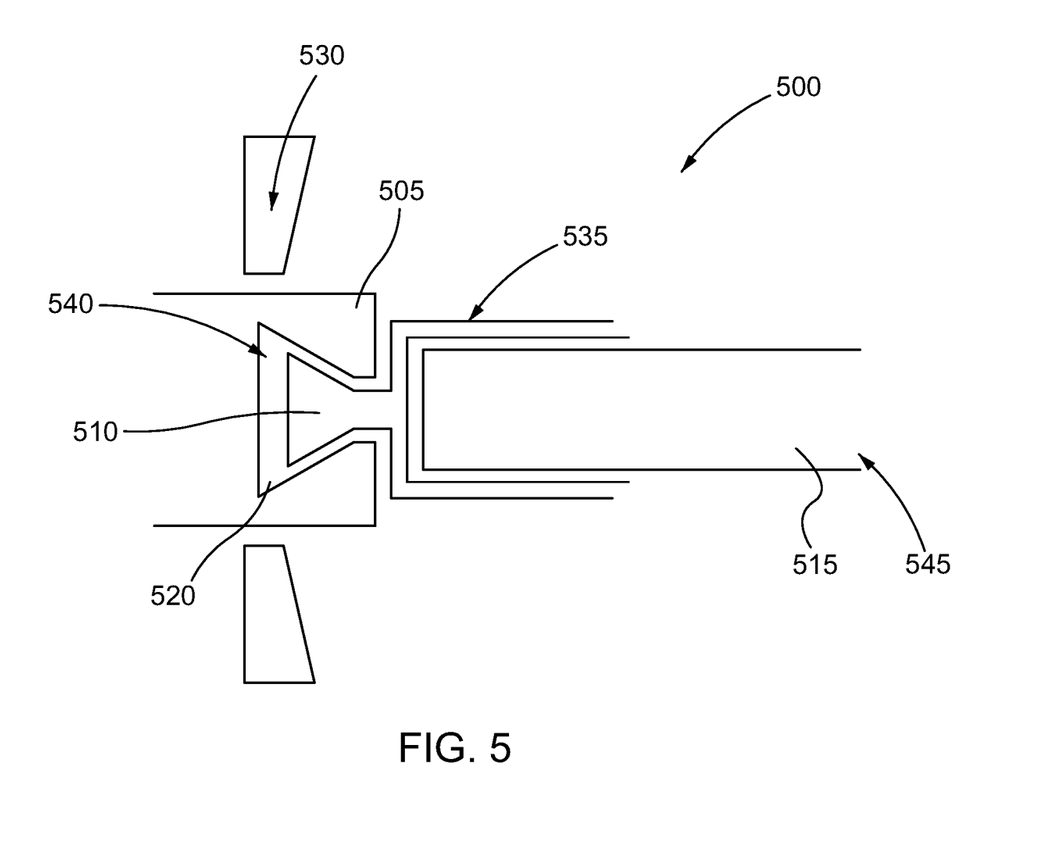
FIG. 5 illustrates an exemplary embodiment of an apparatus with a dovetail joint.

FIG. 5 illustrates an exemplary embodiment of an apparatus 500 with a dovetail joint. As shown, the apparatus 500 includes a node 505, an interconnect 510, a tube 515, a socket 520, and a crimper 530. The node 505 includes a distal end 545 and a proximal end 540.

As shown, the distal end 535 of the interconnect 510 has an end cap configured to slide over an end portion of the tube 515. The proximal end 540 of the interconnect 510 has a dovetail shape. The proximal end 540 fits into the dovetail shaped socket, such as the socket 520. The socket 520 and the proximal end 540, together, form a dovetail joint.

As discussed with respect to FIG. 1, the apparatus 500 may also be printed with support structures that may be broken after printing so that the proximal end 540 of the interconnect 510 can move around within the socket 520, similar to that of the head 140 and socket 130 of FIG. 1. Also similar, the socket 520 may be configured to allow the interconnect 510 to have rotational and/or linear motion. Once the interconnect 510 is in place, it is secured via swaging. That is, the node 505 is deformed by the crimpers 530 such that the interconnect 510 is held in place.

Optionally, the apparatus 500 may also include an injection port and/or vacuum port, as described above to apply an adhesive to fix the interconnect 510 in place. The adhesion process may be used in addition to or in lieu of swaging the node 505.

Figure 6:
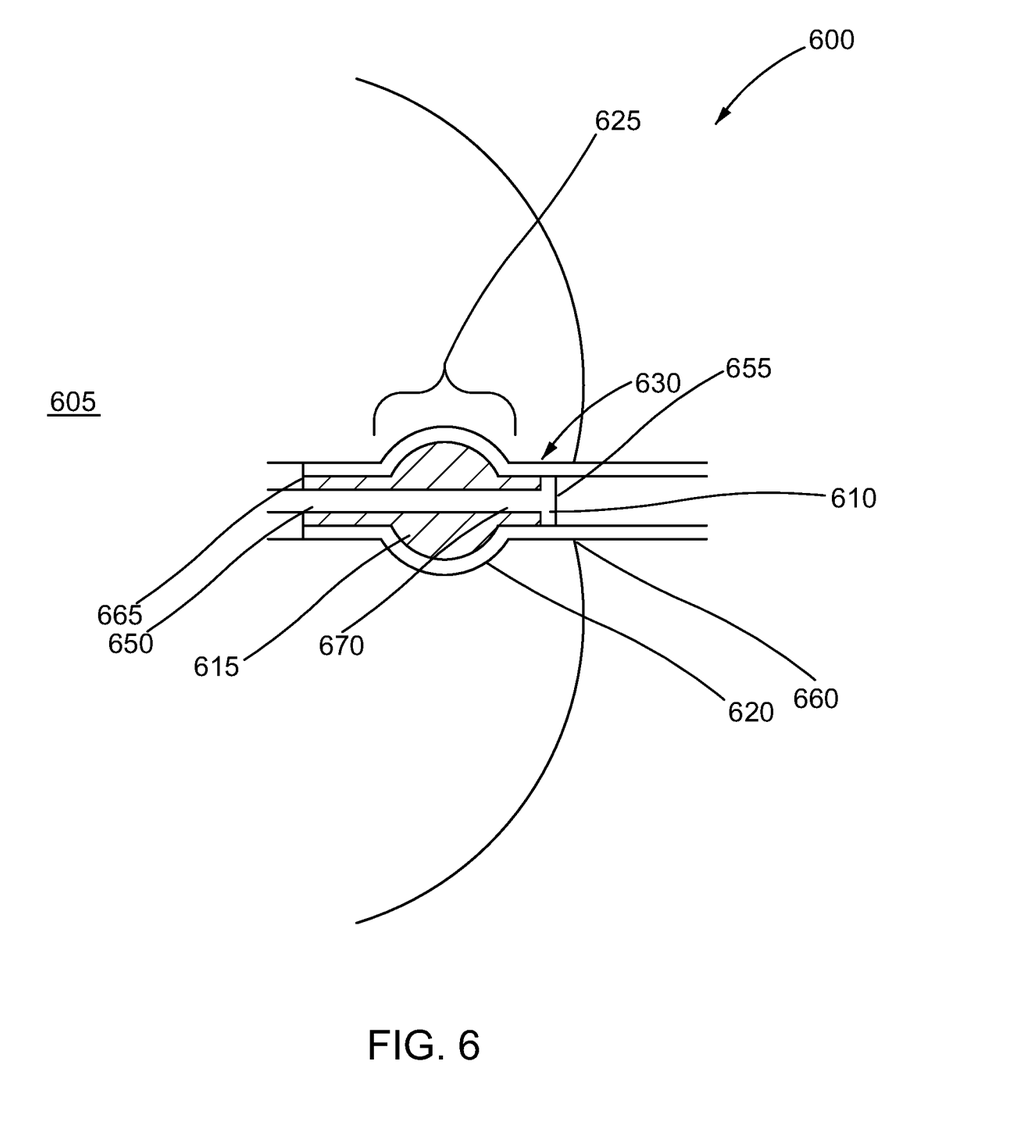
FIG. 6 illustrates an exemplary embodiment of an apparatus having a socket with an outward bulge.

By additively manufacturing parts, a variety of different shapes and configurations can be realized that were not possible with traditional manufacturing techniques for complex mechanical structures. The dovetail joint is one example of a configuration that can be generated by additively manufacturing a node and interconnect. FIG. 6, as will be discussed below, illustrates another example of a node and interconnect that can be generated by additively manufacturing the node and interconnect.

FIG. 6 illustrates an exemplary embodiment of an apparatus 600 having a socket with an outward bulge. As shown, the apparatus 600 includes a node 605, an interconnect 610, material 615, and a tube 620. The node 605 includes a socket 630 with a section 625 having an outward bulge.

In some embodiments of the apparatus, the socket 630 is substantially cylindrical. The interconnect 610 includes a shaft 670 that is connected to an interior surface 665 of the socket 630 opposite an opening 660 of the socket 630. In some embodiments of the apparatus, the interconnect is a mandrel. Additionally, the interconnect includes head 655 at the proximal end as well as a distal end 650. As shown, the head 655 is extendable beyond the opening of the socket 630. As described above, the socket 630 includes a section 625 with an outward bulge around a portion of the interconnect shaft 670.

As shown, an end portion of the tube 620 is positioned over the interconnect 610. The end portion of the tube 620 also includes a section 625 that has an outward bulge around the shaft 670 of the interconnect 610.

The injected material 615 may be a polymer such as silicone or a hydraulic fluid. As shown, the material 615 is applied in between the end portion of the tube 620 and the interior surface 665 of the socket 630 and the head 655 of the interconnect 610.

In some embodiments of the apparatus, a hydroforming process is utilized to cause the tube 620 to deform. For the hydroforming process, the material 615 is a hydroforming material such as silicone that is injected in the tube 620 after the tube 620 is inserted in the socket 630. The injected material in combination with the interconnect 610 generates pressure within the tube 620. The pressure causes the tube 620 to deform by bulging along the portion 625 of the socket 630 that has the outward bulge. This deformity forms a mechanical seal between the tube 620 and the node 605. At the culmination of the hydroforming process, the material is expelled from the socket 630 and the tube 620 is connected to the node 605.

Figure 7:
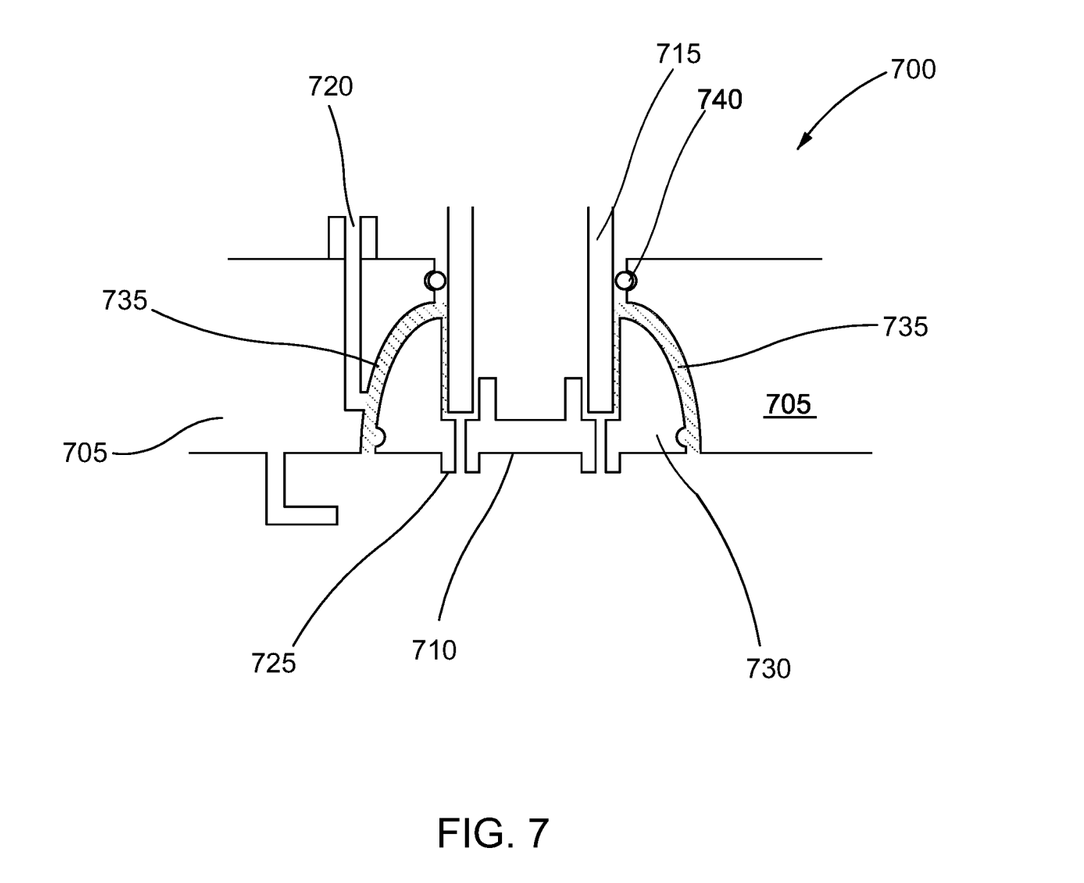
FIG. 7 illustrates an exemplary embodiment of an apparatus having a pair of nodes.

In some embodiments of the apparatus, more than one node may be utilized to connect a component such as a tube. FIG. 7 illustrates an exemplary embodiment of an apparatus 700 having a pair of nodes. As shown, the apparatus 700 includes first and second nodes 705 and interconnect 710. The nodes 705 and interconnect 710 are co-printed by additive manufacturing. The apparatus 700 also includes a tube 715, and injection port 720, a vacuum port 725, at least one slide 730, adhesive material 735, and screw threads 740.

As shown, the interconnect 710 is configured to connect the first and second nodes 705 to the tube 715. In some embodiments of the apparatus, the interconnect 710 comprises an end cap having one or more slides 730 configured to slide into an end portion of the tube 715. For instance, the slides 730 may comprise several semicircular slides configured to slide into an end portion of the tube 715.

The first and second nodes 705 may be arranged with the end cap to form a slot through which the tube 715 slides through to attach the end portion of the tube 715 to the end cap.

The left-most node 705 includes the injection port 720, which includes a channel extending from an exterior surface of the node to the slot for adhesive injection. The node 705 also includes the vacuum port 725, which includes a second channel extending from the exterior surface of one of the nodes 705 to the slot. The injection port 720 and the vacuum port 725 cooperatively work to inject and pull the adhesive material 735 through the slot to hold the slot and tube in place. In some embodiments of the apparatus the vacuum port may enable at least a partial vacuum environment through the slot. Screw threads 740, in conjunction with threaded screws, may alternatively be used to hold the slides 730 in place instead of the adhesive material 735.

Figure 8:
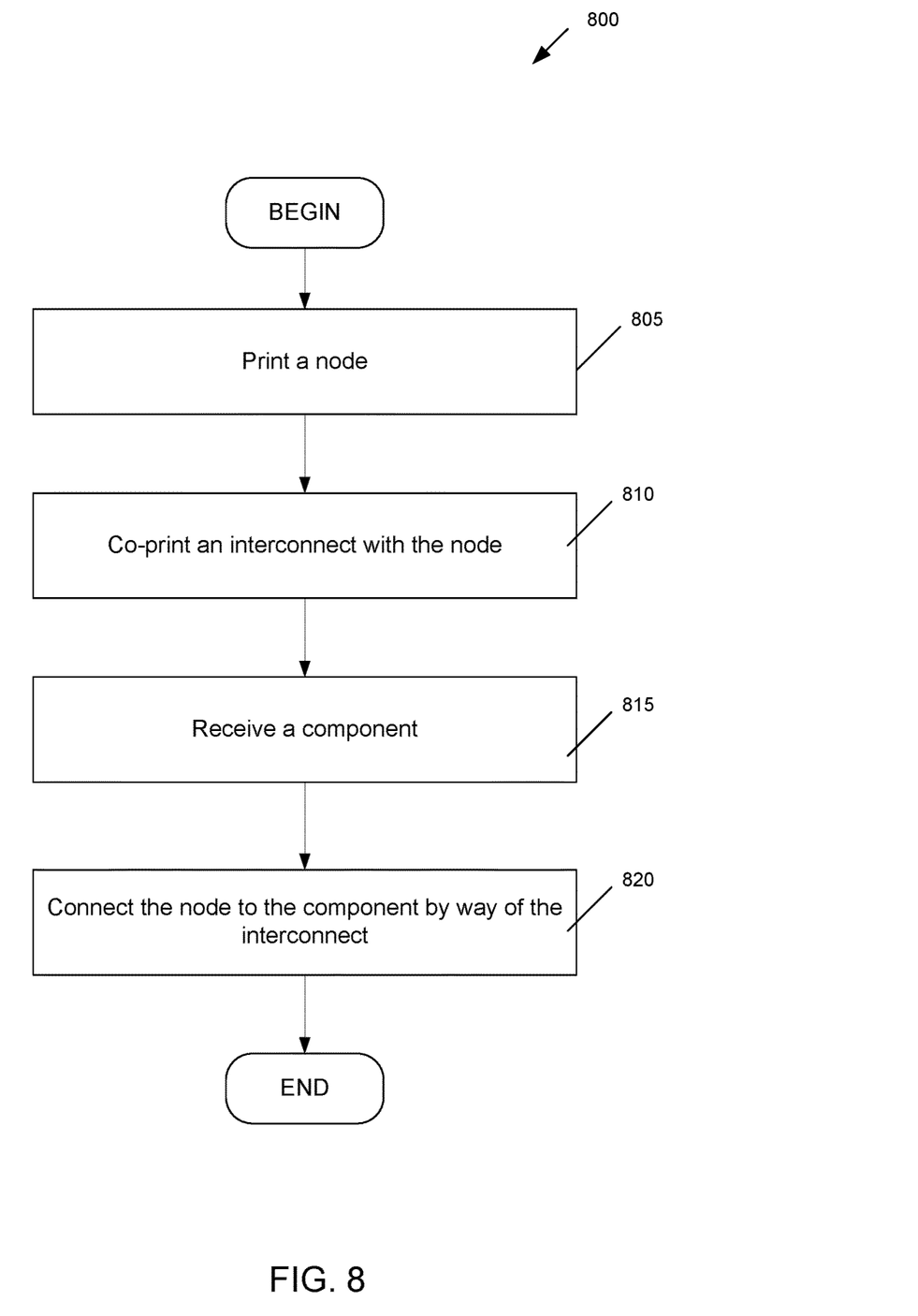
FIG. 8 conceptually illustrates a process for joining an additively manufactured node to a component.

FIG. 8 conceptually illustrates a process 800 for joining an additively manufactured node to a component. The process 800 may begin after instructions for co-printing a node and an interconnect are received by an additive manufacturing printer.

As shown, the process 800 prints (at 805) a node. The node may be a node such as the node 105 described with respect to FIG. 1. The process 800 co-prints (at 810) an interconnect with the node. The interconnect may be an interconnect such as interconnect 110 described with respect to FIG. 1. In some embodiments of the process, the node and interconnect are co-printed as part of an additive manufacturing process. The process receives (at 815) a component. The component may be a tube such as the component (e.g., tube) 135 described with respect to FIG. 1. The process 800 connects (at 820) the node to the component by way of the interconnect.

Figure 9:
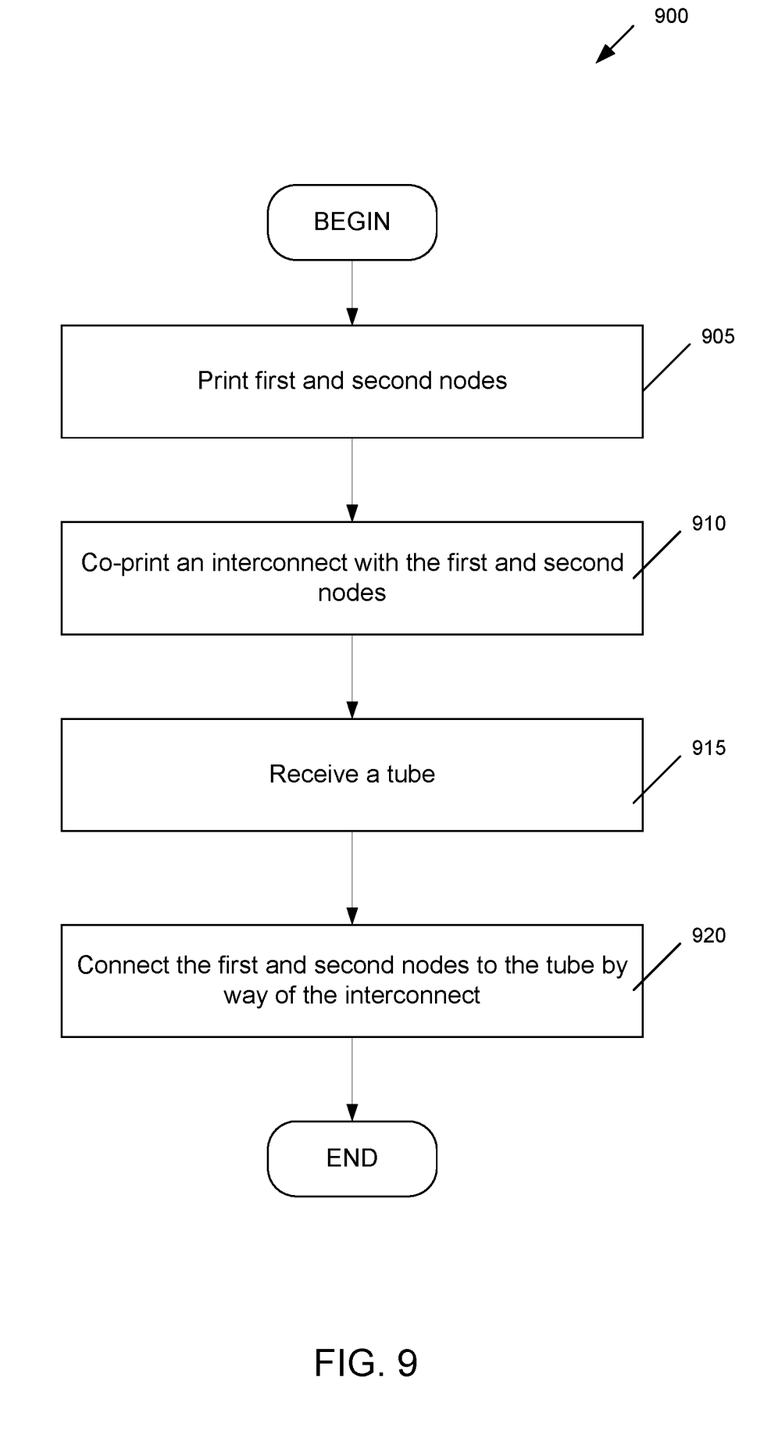
FIG. 9 conceptually illustrates a process for joining an additively manufactured node to a tube.

FIG. 9 conceptually illustrates a process 900 for joining an additively manufactured node to a tube. The process 900 may begin after instructions for co-printing a node and an interconnect are received by an additive manufacturing printer.

As shown, the process 900 prints (at 905) first and second nodes. The first and second nodes may be similar to the first and second nodes 705 described with respect to FIG. 7. The process 900 co-prints (at 910) an interconnect with the first and second nodes. The interconnect may be similar to the interconnect 710 described with respect to FIG. 7. In some embodiments of the process, the first and second nodes and the interconnect are co-printed as part of an additive manufacturing process. The process 900 receives (at 915) a tube. The tube may be similar to the tube 715 described with respect to FIG. 7. The process 900 connects (at 920) the first and second nodes to the tube by way of the interconnect.

The capability to additively manufacture parts provides the advantageous benefit of generating shapes, configurations, and structures that are not available in conventional manufacturing processes. For instance, in conventional manufacturing processes, parts are typically joined by welding. However, with an additively manufactured node, it is possible to print injection and vacuum ports for applying adhesives to attach parts. Moreover, joints may be provided by co-printing joints and interconnects that enable nodes to be connected to various components such as tubes.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   an additively manufactured node; and
   an additively manufactured interconnect co-printed with the node, wherein the interconnect is configured to connect the node to a component;
   wherein the node comprises a channel extending from an exterior surface of the node to a socket for adhesion injection, and a second channel extending from the exterior surface of the node to the socket for enabling at least a partial vacuum environment during adhesion injection.

2. The apparatus of claim 1, wherein the interconnect is further configured to connect the node to the component comprising a tube.

3. The apparatus of claim 2, wherein the node comprises a socket and the interconnect comprises a proximal end that together with the socket forms a joint therebetween that provides a range of linear motion between the interconnect and the node.

4. The apparatus of claim 2, wherein the node comprises a socket and the interconnect comprises a proximal end that together with the socket forms a rotating joint therebetween.

5. The apparatus of claim 4, wherein the proximal end of the interconnect has a spherical shape.

6. The apparatus of claim 4, wherein the proximal end of the interconnect has an ellipsoidal shape.

7. The apparatus of claim 2, wherein the proximal end of the interconnect has a dovetail shape.

8. The apparatus of claim 2, wherein the interconnect comprises a distal end configured to slide into an end portion of the tube.

9. The apparatus of claim 2, wherein the interconnect comprises a distal end having an end cap configured to slide over an end portion of the tube.

10. The apparatus of claim 2, wherein the node comprises a substantially cylindrical socket and the interconnect comprises a shaft connected to an interior surface of the socket opposite a socket opening and a head at a distal end of the shaft, the head being extendable beyond the opening in the socket.

11. The apparatus of claim 10, wherein the socket comprises a section having an outwardly bulge around a portion of the shaft.

12. The apparatus of claim 11, further comprising the tube having an end portion positioned over the interconnect.

13. The apparatus of claim 12, wherein the end portion of the tube comprises a section having an outwardly bulge around said section of the shaft.

14. The apparatus of claim 13, further comprising hydroforming material in the end portion of the tube between said interior surface of the socket and the head of the interconnect.

15. A method of joining an additively manufactured node to a component, the method comprising:
    printing a node; and
    co-printing, with the node, an interconnect, wherein the node and interconnect are co-printed by an additive manufacturing process;
    receiving a component; and
    using the interconnect to connect the node to the component.

16. The method of claim 15, wherein the component comprises a tube, and wherein using the interconnect to connect the node comprises using the interconnect to connect the node to the tube.

17. The method of claim 16, wherein the interconnect comprises a proximal end, the method further comprising:
    forming a socket within the node; and
    forming a joint between the proximal end of the interconnect and the socket that provides a range of linear motion between the interconnect and the node.

18. The method of claim 16, wherein the interconnect comprises a proximal end, the method further comprising:
    forming a socket within the node; and
    forming a rotating joint between the proximal end of the interconnect and the socket.

19. The method of claim 18, further comprising forming a spherical end at the proximal end of the interconnect.

20. The method of claim 18, further comprising forming an ellipsoidal end at the proximal end of the interconnect.

21. The method of claim 17, further comprising forming a dovetail end at the proximal end of the interconnect.

22. The method of claim 16, where in the interconnect comprises a distal end and the tube comprises an end portion, the method further comprising sliding the distal end of the interconnect into the end portion of the tube.

23. The method of claim 16, wherein the interconnect comprises a distal end and the tube comprises an end portion, the method further comprising:
    forming an end cap at the distal end of the interconnect; and
    sliding the end cap over the end portion of the tube.

24. The method of claim 15, further comprising forming a first channel extending from an interior surface of the node to a socket for adhesion injection.

25. The method of claim 24, further comprising:
    forming a second channel extending from an exterior surface of the node to the socket;
    enabling, from the second channel, at least a partial vacuum environment during adhesion injection.

26. The method of claim 24, further comprising:
    forming an adhesive port connected to the channel at an exterior surface of the node; and
    attaching a detachable adhesive mixer to the adhesive port.

27. The method of claim 16, wherein printing the node comprises forming a substantially cylindrical socket, and wherein co-printing the interconnect comprises forming a shaft, wherein the shaft is connected to an interior surface of the socket opposite a socket opening and a head at a distal end of the shaft, the head being extendable beyond the opening in the socket.

28. The method of claim 27, wherein forming the socket comprises forming a portion of the socket to have an outwardly bulge around a portion of the shaft.

29. The method of claim 28, further comprising positioning an end portion of the tube over the interconnect.

30. The method of claim 29, further comprising deforming a section of the end portion of the tube to have an outwardly bulge around said section of the shaft.

31. The method of claim 30, further comprising applying hydroforming material to the end portion of the tube between said interior surface of the socket and the head of the interconnect.

32. An apparatus, comprising:
    an additively manufactured node;
    an additively manufactured interconnect co-printed with the node, wherein the interconnect is configured to connect the node to a component;
    wherein the node comprises a channel extending from an exterior surface of the node to a socket for adhesion injection, and
    further comprising an adhesive port connected to the channel at the exterior surface of the node and a detachable adhesive mixer connected to the adhesive port.

* * * * *